United States Patent Office 3,197,018
Patented July 27, 1965

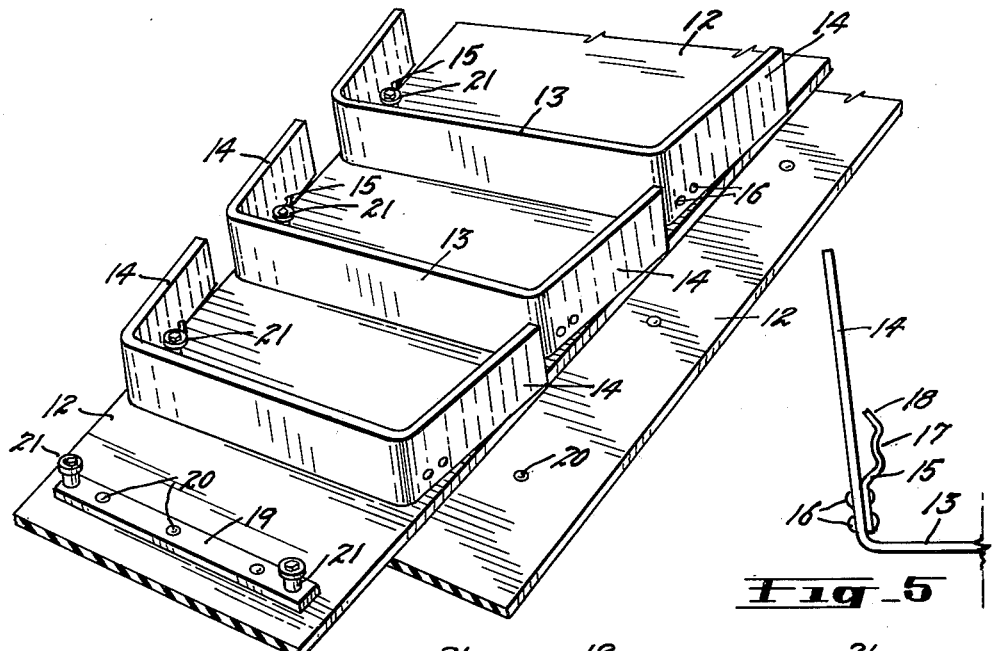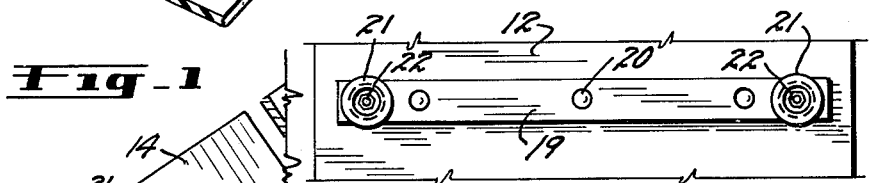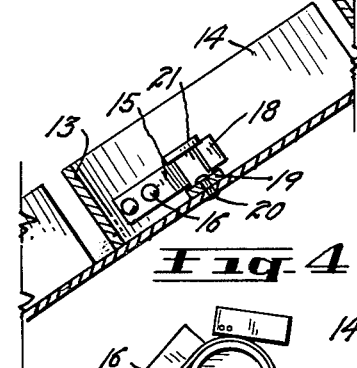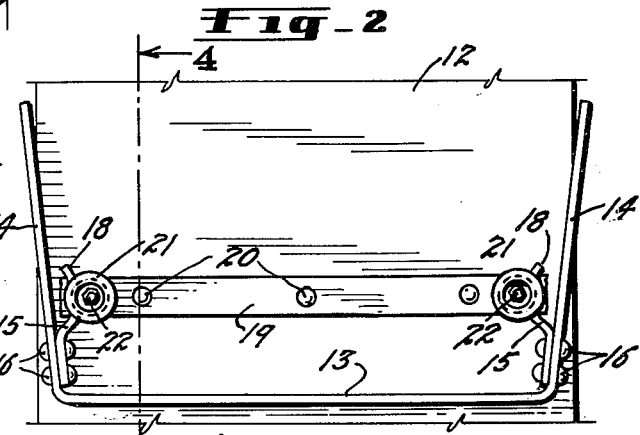

3,197,018
BELT CONVEYORS
Allan J. Kayser, 712 S. Gilpin St., Denver, Colo.
Filed Oct. 28, 1963, Ser. No. 319,427
5 Claims. (Cl. 198—151)

This invention relates to a belt conveyor of the type provided with buckets or flights for elevating material such as ore, sand, earth, etc. Elevating conveyors of this type have been objectionable and expensive to maintain due to constant belt damage resulting from the buckets or flights becoming obstructed or overloaded and tearing away from the belt as the latter continues in motion.

The principal object of this invention is to provide a material-elevating belt conveyor with automatically-releasable flights which, when extreme resistances are encountered, will automatically release themselves from the belt without damage to the latter.

A further object is to provide automatically releasable flights for a belt conveyor which can be quickly and easily replaced in working position on the belt, when the obstruction has been removed, without the use of tools and without it being necessary to stop the travel of the belt.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a fragmentary perspective view of an intermediate portion of a material-elevating belt conveyor showing the improved self-releasable flights in place thereon;

FIG. 2 is a top view of a selected portion of the belt of FIG. 1 showing a flight retaining bar as employed in this invention mounted thereon;

FIG. 3 is a similar top view showing one of the improved flights mounted on the retaining bar;

FIG. 4 is a cross section taken on the line 4—4, FIG. 3;

FIG. 5 is a fragmentary top view looking downwardly on the left extremity of a typical flight removed from the belt; and FIG. 6 is a reduced scale, diagrammatic view showing the relative positions of the improved flights as they travel over the head roller of an elevating belt conveyor.

In the drawing, portions of a typical endless, inclined conveyor belt are indicated at 12. The belt may be any of the conventional types such as leather or rubber or neoprene reinforced with imbedded fabric or cords. It may have any desired width and length. This invention pertains to means for mounting buckets or flights upon the belt to retain the material being elevated in place thereon.

The releasable flights are indicated at 13 and preferably comprise an elongated U-shaped, metal band of greater width than thickness having a midportion corresponding substantially to the width of the belt and two similar end portions 14 extending forwardly in the plane of the midportion. A resilient flexible, metallis clip 15 is riveted by means of suitable rivets 16, or is otherwise secured in aligned relation to the inside face of each end portion 14 adjacent to the bights of each flight 13. The clips 15 are initially bent to form arcuately indented sockets 17 adjacent their forward extremities and the latter extremities are bent toward the end portions 13 of the flight, as shown at 18, so that the extremities of the two clips on each flight will flare away from each other.

The above described flights are detachably secured to the belt 12 in uniformly spaced relation through the medium of transversely extending retaining bars 19 which are permanently secured to the belt 12 in any desired manner such as by means of suitable rivets 20. An upstanding flanged spool 21 is rotatably mounted upon a spool bolt 22 at each extremity of each retaining bar 19. The flanged spools are spaced center-to-center from each other on the retaining bars a distance slightly in excess of the center-to-center distance between the sockets 17 of the clips 15.

It is believed that the method of mounting the flights on the belt is apparent from the above. Briefly, the flights are applied by placing them on the belt rearwardly of the retaining bars 19 then forcing them forwardly until the sockets 17 in the two clips 15 snap about the two spools 21 of that retaining bar as shown in FIG. 3.

Should any flight be obstructed while the belt is traveling, that flight will simply remain stationary allowing the spools 21 to pull forwardly from the embrace of the clips 15 to release the flight from the belt without damage to the latter.

It is preferred to flare the two end portions 14 outwardly, as illustrated, to enable the flights to nest into each other as they successively pull loose from the spools 21 in cases of continuous obstruction.

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. A material conveyor comprising:
   (a) an endless belt;
   (b) attachment bars secured transversally of said belt in longitudinally spaced relation;
   (c) a material carrying flight positioned rearwardly of each attachment bar; and
   (d) spring clips mounted on each flight and releasably engaging said spool-like elements.

2. A material conveyor comprising:
   (a) an endless conveyor belt;
   (b) attachment bars secured to and extending transversally of said belt in spaced-apart relation;
   (c) U-shaped metal flights with their midportions positioned rearwardly of and parallel to said attachment bars and with their terminal portions extending forwardly beyond each extremity of each attachment bar;
   (d) a flanged spool element extending upwardly from each extremity of each attachment bar;
   (e) a spring clip secured to the inside face of each terminal portion; and
   (f) a receiving socket in each spring clip, said sockets partially and releasably surrounding said flanged spool element so as to release said flight in case of overload.

3. A self-releasable flight for conveyor belts comprising:
   (a) an attachment bar adapted to be secured transversally of said belts;
   (b) a flanged spool secured to and extending upwardly from each extremity of said bar;
   (c) an elongated U-shaped metal band with its midportion positioned rearwardly of and parallel to said bar and with its end portions extending forwardly beyond each extremity of said bar; and
   (d) releasable attachment members mounted on said band and detachably engaging said flanged spools to releasably secure said band to said bar.

4. A self-releasable flight for conveyor belts as described in claim 3 in which the releasable attachment members comprise:
 (a) resiliently flexible, elongated spring arms secured inside the end portions of said bands; and
 (b) arcuate sockets formed in said arms, said flanged spools being received in said sockets.

5. A self-releasable flight for conveyor belts as described in claim 4 in which the end portions of each band are flared outwardly so that said U-shaped bands may be nested.

References Cited by the Examiner

UNITED STATES PATENTS

| | | | |
|---|---|---|---|
| 993,650 | 5/11 | Clements | 198—151 |
| 1,820,609 | 8/31 | Erikson | 198—151 |

SAMUEL F. COLEMAN, *Primary Examiner.*

WILLIAM B. LA BORDE, *Examiner.*